Patented May 7, 1946

2,399,949

UNITED STATES PATENT OFFICE 2,399,949

COMPOUNDING AND VULCANIZATION OF SYNTHETIC RUBBER

Albert A. Somerville, Carmel, N. Y., assignor to R. T. Vanderbilt Co. Inc., New York, N. Y., a corporation of New York No Drawing. Application March 2, 1944, Serial No. 524,783

10 Claims. (Cl. 260—79)

My invention relates to improvements in the compounding and vulcanization of synthetic rubbers of the type produced by copolymerization of butadiene and styrene. This type of synthetic rubber is illustrated by the product currently designated GR-S rubber. My present invention comprises particularly the product of vulcanization of copolymer compounds containing added copper. Subject matter claimed herein is disclosed in my prior application filed February 17, 1944, Serial No. 522,785.

Variability, particularly with respect to rate of cure, has been one of the characteristics of GR-S rubber currently available involving a variety of substantial difficulties in the manufacture of vulcanized products from GR-S stocks. Even though supposedly identical techniques and formulations are used by several producers, such synthetic rubber from one producer will, for example, exhibit a generally higher rate of cure than that from others. But different samples from a single five ton lot from one producer will also frequently exhibit markedly different rates of cure. This variability is a serious burden upon the production of vulcanized products and involves the production of substantial quantities of defective goods. Defects frequently appear, for example, in inner tube sections adjacent valve parts and in relatively thick sections subjected to rapid curing as in rubber heels as the result of such variability.

In studying the properties of GR-S stocks, I added measured quantities of metallic copper to a GR-S compound to determine the precise effect of copper in such compounds after I heard reports that GR-S stocks frequently failed to cure when applied as insulation in contact with copper, for example in areas of defective tinning when applied to tinned copper conductors as in conventional practice. Copper is rigorously excluded from natural rubber compounds; copper seriously degrades vulcanized natural rubber compounds and radically accelerates ageing of such compounds. To my amazement, I found that appropriate additions of copper accelerated the vulcanization of the GR-S stocks I used in my experiments without adversely affecting their properties with respect to ageing. The acceleration in rate of cure was so great as to submerge the variability in rate of cure ordinarily exhibited by GR-S rubber.

When I attempted to reconcile these results with the reports which provoked my experiments, I found that the GR-S compounds which exhibited such curing failures were so-called sulfurless stocks. Continuing my experiments, with this clue, I found that my new results were obtained with appropriate additions of copper, as such or as an appropriate compound, in compounds of GR-S rubber containing an amount of sulfur, as such, exceeding the amount required to form cupric sulfide with the copper present. Sulfur combines with copper, to form cupric sulfide, in amount about 50% by weight on the copper. The range of copper additions with which my new results were attained approximated 0.005–1% by weight on the GR-S rubber. With additions below the lower limit, 0.005%, my new results were not regularly attained. With additions above 1%, the results began to resemble those incident to the addition of copper to natural rubber compounds.

Then I observed that all of the compounds used in my experiments had contained a dithiocarbamate, either as an accelerator or as an activator of another accelerator. Continuing my experiments to determine the significance of this observation, I discovered that, although additions of copper improved a variety of compounds, the remarkable results I had attained were characteristic of compounds which also contained at least a small proportion of a dithiocarbamate or a thiuram sulfide. Both the dithiocarbamates and the thiuram sulfides are characterized by the group

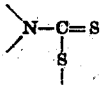

I also found that better results were secured with compounds containing a thiazole accelerator, in addition to a small proportion of a dithiocarbamate or a thiuram sulfide, than with other accelerators.

I also tried the addition of copper to other types of synthetic rubber but my new results seemed to be peculiar to GR-S type synthetic rubber. These new results contradicted all my previous experience with other rubbers.

The product of my invention is the product of vulcanization of a copolymer of butadiene and styrene and about 0.005–1%, or better 0.01–0.5%, by weight on the copolymer of copper, sulfur in conventional amount but exceeding as a minimum about 50% by weight on the copper as copper, and about 0.1–1% by weight on the copolymer of a dithiocarbamate or a thiuram sulfide. The compound vulcanized to produce the product of my invention may also include, with advantage, about 0.5–2.5% by weight on the copolymer of a thiazole accelerator.

The following examples will illustrate practices embodying my invention and include comparisons indicating some of its advantages. In the tabulations of these compounds, cures and physical properties, the compound of each example was made up of the number of parts by weight indicated opposite each designated component, the cures were in a platen press for the periods indicated in minutes at the left under the curing temperature, all of the cures in each group being effected at the same temperature, and, for each period of cure, the values for stress at 300% elongation, in pounds per square inch appear under "S," for tensile strength in pounds per square inch under "T," for percentage elongation at break under "E," and for Shore hardness under "H."

The foregoing Examples I to IV illustrate the results of my first experiments with copper in GR-S rubber. The copper used was electrolytic copper passing a 300 mesh per inch screen. The acceleration in rate of cure will be apparent from a comparison of the physical properties particularly for the 10 and 15 minute cures.

|  | Example V | Example VI | Example VII | Example VIII | Example IX |
|---|---|---|---|---|---|
| GR-S rubber | 100 | 100 | 100 | 100 | 100 |
| Plasticizer | 5 | 5 | 5 | 5 | 5 |
| Zinc oxide | 5 | 5 | 5 | 5 | 5 |
| Channel carbon black | 50 | 50 | 50 | 50 | 50 |
| Sulfur | 2 | 2 | 2 | 2 | 2 |
| Benzothiazyldisulphide | 1.5 | 1.5 | 1.5 | 1.5 | 1.5 |
| Zinc diethyldithiocarbamate | .15 | .15 | .15 | .15 | .15 |
| Powdered copper | --- | .5 | 1 | 3 | 5 |

BEFORE AGEING

| 307° F. | S | T | E | S | T | E | S | T | E | S | T | E | S | T | E |
|---|---|---|---|---|---|---|---|---|---|---|---|---|---|---|---|
| 3 minutes | Uncured | | | 240 | 520 | 610 | Uncured | | | Uncured | | | Uncured | | |
| 5 minutes | Uncured | | | 450 | 1515 | 650 | 270 | 535 | 620 | Uncured | | | Uncured | | |
| 10 minutes | 455 | 1620 | 650 | 1190 | 2470 | 490 | 775 | 2340 | 610 | 275 | 435 | 580 | Uncured | | |
| 15 minutes | 740 | 2490 | 635 | 1460 | 2560 | 400 | 1300 | 2510 | 465 | 385 | 1110 | 615 | Uncured | | |
| 20 minutes | 1140 | 2820 | 530 | 1740 | 2080 | 345 | 1690 | 2410 | 385 | 585 | 1930 | 620 | Uncured | | |

|  | Example X | Example XI | Example XII | Example XIII |
|---|---|---|---|---|
| GR-S rubber | 100 | 100 | 100 | 100 |
| Plasticizer | 5 | 5 | 5 | 5 |
| Zinc oxide | 5 | 5 | 5 | 5 |
| Channel carbon black | 50 | 50 | 50 | 50 |
| Sulfur | 2 | 2 | 2 | 2 |
| Benzothiazyldisulphide | 1.5 | 1.5 | 1.5 | 1.5 |
| Zinc diethyldithiocarbamate | .15 | .15 | .15 | .15 |
| Powdered copper | .10 | .01 | .005 | .001 |

| 307° F. | S | T | E | S | T | E | S | T | E | S | T | E |
|---|---|---|---|---|---|---|---|---|---|---|---|---|
| 3 minutes | 675 | 2025 | 615 | Uncured | | | Uncured | | | Uncured | | |
| 10 minutes | 1375 | 2275 | 415 | 740 | 2360 | 610 | 630 | 1850 | 565 | 365 | 1300 | 670 |
| 15 minutes | 1670 | 2355 | 390 | 1140 | 2475 | 500 | 1055 | 2575 | 545 | 705 | 2300 | 610 |
| 20 minutes | 1865 | 2080 | 315 | 1385 | 2375 | 415 | 1290 | 2465 | 460 | 1025 | 2100 | 470 |
| 30 minutes | 2025 | 2265 | 340 | 1710 | 2220 | 370 | 1695 | 2110 | 360 | 1450 | 2440 | 435 |

The foregoing Examples V to XIII illustrate the effect of variations in the amount of added

|  | Example I | Example II | Example III | Example IV |
|---|---|---|---|---|
| GR-S rubber | 100 | 100 | 100 | 100 |
| Plasticizer | 5 | 5 | 5 | 5 |
| Zinc oxide | 5 | 5 | 5 | 5 |
| Channel carbon black | 50 | 50 | 50 | 50 |
| Sulfur | 2 | 2 | 2 | 2 |
| Benzothiazyldisulphide | 1.5 | 1.5 | 1.5 | 1.5 |
| Zinc diethyldithiocarbamate | .15 | .15 | .15 | .15 |
| Powdered copper | --- | .10 | .50 | 1 |

BEFORE AGEING

| 307° F. | S | T | E | H | S | T | E | H | S | T | E | H | S | T | E | H |
|---|---|---|---|---|---|---|---|---|---|---|---|---|---|---|---|---|
| 10 minutes | 275 | 910 | 745 | 45 | 1130 | 2280 | 445 | 59 | 1070 | 2300 | 540 | 60 | 830 | 2580 | 600 | 59 |
| 15 minutes | 550 | 2160 | 700 | 53 | 1510 | 2400 | 395 | 62 | 1430 | 2380 | 415 | 61 | 1220 | 2220 | 430 | 60 |
| 20 minutes | 770 | 2350 | 625 | 56 | 1710 | 2520 | 385 | 65 | 1570 | 2500 | 400 | 63 | 1260 | 2480 | 430 | 61 |
| 30 minutes | 1090 | 2680 | 505 | 60 | 1820 | 2340 | 385 | 65 | 1630 | 2460 | 400 | 64 | 1590 | 2650 | 425 | 63 |

AFTER 24 HOURS IN HOT AIR OVEN AT 250° F.

| 307° F. | S | T | E | H | S | T | E | H | S | T | E | H | S | T | E | H |
|---|---|---|---|---|---|---|---|---|---|---|---|---|---|---|---|---|
| 10 minutes | | 1630 | 150 | 77 | | 1200 | 100 | 81 | | 1220 | 115 | 81 | | 1350 | 130 | 80 |
| 15 minutes | | 1200 | 110 | 80 | | 1320 | 115 | 81 | | 1290 | 105 | 80 | | 1340 | 130 | 80 |
| 20 minutes | | 1320 | 125 | 80 | | 1490 | 130 | 81 | | 1360 | 130 | 80 | | 1520 | 150 | 80 |
| 30 minutes | | 1450 | 135 | 80 | | 1560 | 240 | 83 | | 1450 | 160 | 80 | | 1640 | 155 | 80 | copper. Again the copper used was electrolytic copper passing a 300 mesh screen. Useful results were secured with the addition of copper in amounts ranging from about 0.005% to about 1% on the GR-S rubber. I have secured optimum results with the addition of copper in amounts ranging from about 0.1% to about 0.5% on the GR-S rubber. It will be noted that the sulfur exceeds 50% by weight on the copper in each of the foregoing examples other than the blank, Example V, and the example using 5 parts of copper. Notwithstanding the excess of sulfur used in Example VIII, the results are unsatisfactory with as much as 3 parts of copper. I have examined sections of vulcanizates of Examples VI, VII, X, XI and XII under a microscope at 100 magnifications and these appear, thus examined, to contain The foregoing Examples XIV and XVI illustrate the advantage of thorough dispersion of the copper. Dispersion may be accomplished by using finely divided copper, as in Examples II-IV, VI-XIII and XV or by using copper compounds soluble or partially soluble in the rubber or by using copper compounds predispersed in or upon some appropriate compounding material. For example, copper compounds may be dispersed upon inert fillers or they may be dissolved or dispersed in plasticizers such as mineral oils, coal tar fractions, and esters such as dibutylphthalate. In general, the copper addition may be made to the copolymer of butadiene and styrene, before or during compounding, or it may be made to any compounding material with which it is compatible and thus incorporated in the synthetic rubber compound with the modified compounding material.

|  | Example XVII | Example XVIII | Example XIX | Example XX | Example XXI |
|---|---|---|---|---|---|
| GR-S rubber | 100 | 100 | 100 | 100 | 100 |
| Plasticizer | 5 | 5 | 5 | 5 | 5 |
| Zinc oxide | 5 | 5 | 5 | 5 | 5 |
| Channel carbon black | 50 | 50 | 50 | 50 | 50 |
| Sulfur | 2 | 2 | 2 | 2 | 2 |
| Benzothiazyldisulphide | 1.5 | 1.5 | 1.5 | 1.5 | 1.5 |
| Zinc diethyldithiocarbamate | .15 | .15 | .15 | .15 | .15 |
| Copper powder (through 300 mesh) |  | .10 |  |  |  |
| Copper sulfide |  |  | .15 |  |  |
| Copper sulfate (anhydrous) |  |  |  | .25 |  |
| Copper carbonate |  |  |  |  | .174 |

BEFORE AGEING

| 307° F. | S | T | E | S | T | E | S | T | E | S | T | E | S | T | E |
|---|---|---|---|---|---|---|---|---|---|---|---|---|---|---|---|
| 5 minutes | Uncured |  |  | 305 | 650 | 560 | 460 | 1080 | 580 | 440 | 1080 | 620 | 415 | 1100 | 575 |
| 10 minutes | 320 | 1100 | 735 | 1060 | 2680 | 530 | 1130 | 2780 | 545 | 1220 | 2620 | 490 | 1355 | 2650 | 460 |
| 15 minutes | 635 | 2310 | 655 | 1490 | 2620 | 405 | 1380 | 2620 | 450 | 1610 | 2640 | 415 | 1780 | 2425 | 365 |
| 20 minutes | 870 | 2700 | 580 | 1630 | 2720 | 425 | 1580 | 2490 | 380 | 1850 | 2630 | 375 | 1920 | 2030 | 315 |
| 30 minutes | 1350 | 2640 | 430 | 1910 | 2470 | 365 | 1730 | 2540 | 385 | 2240 | 2520 | 345 | 1930 | 1930 | 300 |

AFTER 24 HOURS IN HOT AIR OVEN AT 250° F.

| 5 minutes |  |  |  | 1140 | 100 |  | 1060 | 90 |  | 1400 | 105 |  | 1500 | 115 |
|---|---|---|---|---|---|---|---|---|---|---|---|---|---|---|---|
| 10 minutes |  | 1170 | 110 | 1150 | 95 |  | 1210 | 105 |  | 1390 | 110 |  | 1530 | 110 |
| 15 minutes |  | 1310 | 110 | 1370 | 110 |  | 1430 | 110 |  | 1380 | 105 |  | 1570 | 115 |
| 20 minutes |  | 1410 | 125 | 1310 | 110 |  | 1460 | 115 |  | 1570 | 115 |  | 1520 | 120 |
| 30 minutes |  | 1500 | 115 | 1440 | 125 |  | 1530 | 120 |  | 1620 | 140 |  | 1480 | 125 | dispersed particles of copper with surfaces darkened as by a film of sulfide.

|  | Example XIV | Example XV | Example XVI |
|---|---|---|---|
| GR-S rubber | 100 | 100 | 100 |
| Plasticizer | 5 | 5 | 5 |
| Zinc oxide | 5 | 5 | 5 |
| Channel carbon black | 50 | 50 | 50 |
| Sulfur | 2 | 2 | 2 |
| Benzothiazyldisulphide | 1.5 | 1.5 | 1.5 |
| Zinc diethyldithiocarbamate | .15 | .15 | .15 |
| Copper powder through 300-mesh screen |  | .1 |  |
| Copper powder through 40-mesh screen |  |  | .1 |

| 307° F. | S | T | E | S | T | E | S | T | E |
|---|---|---|---|---|---|---|---|---|---|
| 5 minutes | Uncured |  |  | 245 | 500 | 475 | Uncured |  |  |
| 10 minutes | 250 | 810 | 695 | 1200 | 2520 | 480 | 510 | 1840 | 650 |
| 15 minutes | 600 | 2000 | 600 | 1620 | 2100 | 345 | 1030 | 2400 | 510 |
| 20 minutes | 860 | 2360 | 555 | 1820 | 2540 | 390 | 1210 | 2420 | 450 |
| 30 minutes | 1320 | 2740 | 490 | 2100 | 2530 | 350 | 1580 | 2280 | 380 |

The foregoing Examples XVII to XXI illustrate the effectiveness of a variety of copper compounds. The amounts of the several compounds used in Examples XIX, XX and XXI are such that the copper, measured as copper, present approximates that in Example XVIII. The copper compounds I have tried which produce comparable results, in terms of the amount of copper measured as copper thus added to the GR-S rubber, include copper sulfide, cuprous oxide, anhydrous copper sulfate, copper sulfate with water of crystallization, copper carbonate, copper nitrate, copper acetate, cuprous chloride, cupric chloride, cuprous mercaptobenzothiazole, cupric mercaptobenzothiazole, copper oleate and copper stearate. In fact the only copper compound I have tried which failed to give my new results, used in appropriate amounts corresponding to their equivalents as copper, is cupric oxide. I have no explanation for this anomaly, but the following Examples XXII to XXV will illustrate my findings.

erties only in the longer cures, 20 and 30 minutes, lacking the accelerating effect of copper.

|  | Example XXII | Example XXIII | Example XXIV | Example XXV |
|---|---|---|---|---|
| GR-S rubber | 100 | 100 | 100 | 100 |
| Plasticizer | 5 | 5 | 5 | 5 |
| Zinc oxide | 5 | 5 | 5 | 5 |
| Channel carbon black | 50 | 50 | 50 | 50 |
| Sulfur | 2 | 2 | 2 | 2 |
| Benzothiazyldisulphide | 1.5 | 1.5 | 1.5 | 1.5 |
| Zinc diethyldithiocarbamate | .15 | .15 | .15 | .15 |
| Copper powder (through 300 mesh) | | .1 | | |
| Cupric oxide | | | .125 | |
| Cuprous oxide | | | | .115 |

BEFORE AGEING

| 307° F. | S | T | E | S | T | E | S | T | E | S | T | E |
|---|---|---|---|---|---|---|---|---|---|---|---|---|
| 5 minutes | Uncured | | | 305 | 650 | 560 | Uncured | | | 470 | 1160 | 585 |
| 10 minutes | 320 | 1100 | 735 | 1080 | 2680 | 530 | 380 | 1130 | 670 | 1220 | 2560 | 470 |
| 15 minutes | 635 | 2310 | 655 | 1480 | 2820 | 405 | 710 | 2260 | 615 | 1650 | 2560 | 400 |
| 20 minutes | 870 | 2700 | 580 | 1630 | 2720 | 425 | 1080 | 2290 | 490 | 1900 | 2450 | 350 |
| 30 minutes | 1350 | 2640 | 430 | 1910 | 2470 | 365 | 1370 | 2110 | 390 | 2050 | 2480 | 335 |

AFTER 24 HOURS IN HOT AIR OVEN AT 250° F.

| | S | T | E | S | T | E | S | T | E | S | T | E |
|---|---|---|---|---|---|---|---|---|---|---|---|---|
| 5 minutes | | | | | 1140 | 100 | | | | | 1190 | 95 |
| 10 minutes | | 1170 | 110 | | 1150 | 95 | | 860 | 100 | | 1350 | 105 |
| 15 minutes | | 1310 | 110 | | 1370 | 110 | | 960 | 95 | | 1420 | 110 |
| 20 minutes | | 1410 | 125 | | 1310 | 110 | | 1080 | 100 | | 1520 | 120 |
| 30 minutes | | 1500 | 115 | | 1440 | 125 | | 1110 | 105 | | 1470 | 115 |

|  | Example XXVI | Example XXVII | Example XXVIII | Example XXIX | Example XXX |
|---|---|---|---|---|---|
| GR-S rubber | 100 | 100 | 100 | 100 | 100 |
| Plasticizer | 5 | 5 | 5 | 5 | 5 |
| Zinc oxide | 5 | 5 | 5 | 5 | 5 |
| Channel carbon black | 50 | 50 | 50 | 50 | 50 |
| Benzothiazyldisulphide | 1.5 | 1.5 | 1.5 | 1.5 | 1.5 |
| Zinc diethyldithiocarbamate | .15 | .15 | .15 | .15 | .15 |
| Sulfur | 2 | 2 | 2 | 2 | 2 |
| Powdered copper | | .1 | | | |
| Powdered iron | | | .1 | | |
| Powdered manganese | | | | .1 | |
| Powdered lead | | | | | .1 |

BEFORE AGEING

| 307° F. | S | T | E | S | T | E | S | T | E | S | T | E | S | T | E |
|---|---|---|---|---|---|---|---|---|---|---|---|---|---|---|---|
| 10 minutes | 250 | 810 | 695 | 1010 | 2440 | 525 | 320 | 1080 | 725 | 370 | 1400 | 705 | 500 | 1270 | 545 |
| 15 minutes | 600 | 2000 | 600 | 1230 | 2520 | 470 | 580 | 2180 | 660 | 680 | 2280 | 639 | 1130 | 2020 | 440 |
| 20 minutes | 860 | 2360 | 555 | 1460 | 2420 | 405 | 870 | 2700 | 595 | 970 | 1970 | 500 | 1480 | 2000 | 375 |
| 30 minutes | 1320 | 2740 | 490 | 1640 | 2400 | 400 | 1350 | 2650 | 400 | 1300 | 1730 | 370 | 1750 | 1770 | 305 |

AFTER AGEING 24 HOURS IN HOT AIR OVEN AT 250° F.

| | S | T | E | S | T | E | S | T | E | S | T | E | S | T | E |
|---|---|---|---|---|---|---|---|---|---|---|---|---|---|---|---|
| 10 minutes | | 875 | 110 | | 1410 | 120 | | 1610 | 135 | | 1490 | 125 | | 895 | 85 |
| 15 minutes | | 1240 | 120 | | 1460 | 120 | | 1640 | 125 | | 1240 | 105 | | 1040 | 100 |
| 20 minutes | | 1100 | 105 | | 1360 | 120 | | 1640 | 130 | | 935 | 85 | | 1130 | 105 |
| 30 minutes | | 1290 | 115 | | 1320 | 120 | | 1310 | 110 | | 810 | 75 | | 1160 | 100 |

The foregoing Examples XXVIII to XXX illustrate the results secured with other metals. The metals used, including the copper in Example XXVII, passed a 300 mesh screen. Iron was the only metal showing any marked improvement, and it was effective in improving physical properties only in the longer cures, 20 and 30 minutes, lacking the accelerating effect of copper. The metals I have tried, without approaching my new results with copper, include aluminum, antimony, bismuth, cadmium, chromium, iron, lead, manganese, molybdenum, nickel, silicon, silver, tin, tungsten and zinc. Copper appears to be unique.

|  | Example XXXI | Example XXXII | Example XXXIII |
|---|---|---|---|
| GR-S rubber | 100 | 100 | 100 |
| Plasticizer | 5 | 5 | 5 |
| Zinc oxide | 5 | 5 | 5 |
| Channel carbon black | 50 | 50 | 50 |
| Sulfur | 2 | 2 | 2 |
| Zinc diethyldithiocarbamate |  |  | .15 |
| Diphenylguanidine | 1.75 | 1.75 | 1.75 |
| Copper (through 300 mesh) |  | .10 | .10 |

BEFORE AGEING

| 307° F. | S | T | E | H | S | T | E | H | S | T | E | H |
|---|---|---|---|---|---|---|---|---|---|---|---|---|
| 5 minutes | Uncured |  |  |  | Uncured |  |  |  |  |  |  |  |
| 10 minutes | 87 | 170 | 870 | 37 | 87 | 130 | 725 | 38 | 420 | 1230 | 700 | 50 |
| 15 minutes | 110 | 285 | 840 | 40 | 105 | 270 | 745 | 40 | 550 | 1690 | 675 | 54 |
| 20 minutes | 130 | 485 | 800 | 45 | 155 | 400 | 700 | 46 | 640 | 1850 | 610 | 55 |
| 30 minutes | 225 | 1020 | 770 | 48 | 310 | 810 | 660 | 49 | 895 | 2080 | 540 | 57 |

AFTER 24 HOURS IN HOT AIR OVEN AT 250° F.

| 5 minutes |  |  |  |  |  |  |  |  |  |  |  |  |
|---|---|---|---|---|---|---|---|---|---|---|---|---|
| 10 minutes | 1585 | 2200 | 400 | 70 | 1800 | 2370 | 395 | 70 |  | 1960 | 250 | 73 |
| 15 minutes | 1840 | 2180 | 345 | 72 | 2120 | 2310 | 330 | 72 |  | 1900 | 235 | 75 |
| 20 minutes | 2110 | 2275 | 335 | 73 |  | 1760 | 245 | 73 |  | 1920 | 240 | 75 |
| 30 minutes |  | 1920 | 270 | 75 |  | 1610 | 215 | 74 |  | 1740 | 205 | 74 |

The foregoing Examples XXXI to XXXIII illustrate the comparative results using diphenylguanidine and copper with and without zinc diethyldithiocarbamate as an activator. Virtually no improvement is secured without the activator, although the improvement is marked with the activator.

|  | Example XXXIV | Example XXXV | Example XXXVI |
|---|---|---|---|
| GR-S rubber | 100 | 100 | 100 |
| Plasticizer | 5 | 5 | 5 |
| Zinc oxide | 5 | 5 | 5 |
| Channel carbon black | 50 | 50 | 50 |
| Sulfur | 2 | 2 | 2 |
| Zinc diethyldithiocarbamate |  |  | .15 |
| Phenylaminomethyl 2 benzothiazyl sulfide | 1.75 | 1.75 | 1.75 |
| Copper (through 300 mesh) |  | .10 | .10 |

BEFORE AGEING

| 307° F. | S | T | E | H | S | T | E | H | S | T | E | H |
|---|---|---|---|---|---|---|---|---|---|---|---|---|
| 5 minutes | Uncured |  |  |  | 200 | 330 | 600 | 40 | 755 | 2080 | 610 | 56 |
| 10 minutes | 390 | 975 | 620 | 50 | 565 | 1550 | 640 | 53 | 1385 | 2200 | 415 | 62 |
| 15 minutes | 675 | 1970 | 630 | 56 | 920 | 1870 | 470 | 57 | 1840 | 2080 | 335 | 63 |
| 20 minutes | 840 | 2340 | 600 | 58 | 1100 | 2230 | 480 | 59 | 1800 | 1850 | 310 | 64 |
| 30 minutes | 1030 | 2330 | 465 | 60 | 1325 | 2250 | 430 | 62 | 1680 | 2060 | 330 | 65 |

AFTER 24 HOURS IN HOT AIR OVEN AT 250° F.

| 5 minutes |  |  |  |  | 1000 | 115 | 74 |  | 1030 | 100 | 78 |
|---|---|---|---|---|---|---|---|---|---|---|---|
| 10 minutes | 1250 | 130 | 75 |  | 1100 | 110 | 79 |  | 1100 | 110 | 79 |
| 15 minutes | 1500 | 140 | 77 |  | 1150 | 115 | 79 |  | 1230 | 120 | 79 |
| 20 minutes | 1230 | 130 | 78 |  | 1370 | 135 | 79 |  | 1440 | 135 | 79 |
| 30 minutes | 1530 | 145 | 79 |  | 1400 | 140 | 78 |  | 1570 | 155 | 78 |

The foregoing Examples XXXIV to XXXVI illustrate the comparative results using phenylaminomethyl 2 benzothiazyl sulfide and copper with and without zinc diethyldithiocarbamate as an activator. Some improvement is secured without of Example XXXX illustrating the marked improvement attained with my invention.

|  | Example XLI | | | | Example XLII | | | | Example XLIII | | | | Example XLIV | | | |
|---|---|---|---|---|---|---|---|---|---|---|---|---|---|---|---|---|
| GR-S rubber | 100 | | | | 100 | | | | 100 | | | | 100 | | | |
| Plasticizer | 5 | | | | 5 | | | | 5 | | | | 5 | | | |
| Zinc oxide | 5 | | | | 5 | | | | 5 | | | | 5 | | | |
| Channel carbon black | 50 | | | | 50 | | | | 50 | | | | 50 | | | |
| Sulfur | 2 | | | | 2 | | | | 2 | | | | 2 | | | |
| Zinc diethyldithiocarbamate | | | | | | | | | .15 | | | | | | | |
| Benzothiazyl 2 monocyclohexyl sulfenamide | 1.75 | | | | 1.75 | | | | 1.75 | | | | 1.75 | | | |
| Copper diethyldithiocarbamate | | | | | | | | | | | | | .15 | | | |
| Copper (through 300 mesh) | | | | | .10 | | | | .10 | | | | | | | |

BEFORE AGEING

| 307° F. | S | T | E | H | S | T | E | H | S | T | E | H | S | T | E | H |
|---|---|---|---|---|---|---|---|---|---|---|---|---|---|---|---|---|
| 5 minutes | Uncured | | | | Uncured | | | | 775 | 2300 | 630 | 56 | Uncured | | | |
| 10 minutes | 610 | 1900 | 620 | 53 | 910 | 2420 | 530 | 58 | 1720 | 1970 | 335 | 63 | 1585 | 1950 | 350 | 62 |
| 15 minutes | 1380 | 2650 | 460 | 60 | 1340 | 2320 | 405 | 62 | 1990 | 2025 | 310 | 64 | 1880 | 2010 | 315 | 63 |
| 20 minutes | 1550 | 2610 | 420 | 62 | 1510 | 2150 | 345 | 63 | 1985 | 2130 | 310 | 65 | 2020 | 2020 | 300 | 65 |
| 30 minutes | 1835 | 2440 | 360 | 64 | 1650 | 2480 | 380 | 64 | 2040 | 2080 | 305 | 66 | | 1970 | 290 | 67 |

AFTER 24 HOURS IN HOT AIR OVEN AT 250°F.

| | | | | | | | | | | | | | | | | |
|---|---|---|---|---|---|---|---|---|---|---|---|---|---|---|---|---|
| 5 minutes | | | | | | | | | 1490 | 130 | 78 | | | | | |
| 10 minutes | | 1610 | 140 | 77 | | 1330 | 130 | 78 | 1010 | 110 | 79 | | 1475 | 120 | 78 | |
| 15 minutes | | 1610 | 145 | 78 | | 1450 | 135 | 80 | 1270 | 120 | 79 | | 1400 | 120 | 79 | |
| 20 minutes | | 1610 | 145 | 79 | | 1430 | 130 | 80 | 1460 | 135 | 79 | | 1470 | 130 | 79 | |
| 30 minutes | | 1760 | 165 | 78 | | 1460 | 125 | 79 | 1750 | 160 | 78 | | 1710 | 150 | 79 | | out the activator but a radical improvement is secured with the activator.

The foregoing Examples XLI to XLIII illustrate the comparative results using benzothiazyl 2

|  | Example XXXVII | | | | Example XXXVIII | | | | Example XXXIX | | | | Example XXXX | | | |
|---|---|---|---|---|---|---|---|---|---|---|---|---|---|---|---|---|
| GR-S rubber | 100 | | | | 100 | | | | 100 | | | | 100 | | | |
| Plasticizer | 5 | | | | 5 | | | | 5 | | | | 5 | | | |
| Zinc oxide | 5 | | | | 5 | | | | 5 | | | | 5 | | | |
| Channel carbon black | 50 | | | | 50 | | | | 50 | | | | 50 | | | |
| Sulfur | 2 | | | | 2 | | | | 2 | | | | 2 | | | |
| Benzothiazyldisulfide | 1.50 | | | | 1.50 | | | | 1.50 | | | | 1.50 | | | |
| Zinc diethyldithiocarbamate | .15 | | | | | | | | | | | | .15 | | | |
| Diphenylguanidine | | | | | .25 | | | | .25 | | | | | | | |
| Copper (through 300 mesh) | | | | | | | | | .10 | | | | .10 | | | |

BEFORE AGEING

| 307° F. | S | T | E | H | S | T | E | H | S | T | E | H | S | T | E | H |
|---|---|---|---|---|---|---|---|---|---|---|---|---|---|---|---|---|
| 5 minutes | Uncured | | | | Uncured | | | | Uncured | | | | 365 | 1000 | 650 | 52 |
| 10 minutes | 135 | 270 | 675 | 44 | 280 | 975 | 760 | 48 | 280 | 890 | 710 | 48 | 1225 | 2500 | 475 | 60 |
| 15 minutes | 350 | 1180 | 710 | 48 | 580 | 2000 | 670 | 55 | 595 | 1940 | 635 | 53 | 1605 | 2580 | 410 | 63 |
| 20 minutes | 530 | 1950 | 700 | 54 | 905 | 2370 | 555 | 58 | 940 | 2620 | 580 | 58 | 1775 | 2560 | 385 | 64 |
| 30 minutes | 1010 | 2595 | 560 | 58 | 1360 | 2670 | 510 | 59 | 1315 | 2860 | 490 | 62 | 1900 | 2530 | 365 | 65 |

AFTER 24 HOURS IN HOT AIR OVEN AT 250° F.

| | | | | | | | | | | | | | | | | |
|---|---|---|---|---|---|---|---|---|---|---|---|---|---|---|---|---|
| 5 minutes | | | | | | | | | | | | | 1390 | 105 | 80 | |
| 10 minutes | | 1650 | 150 | 78 | | 1780 | 155 | 79 | | 1520 | 130 | 79 | 1430 | 125 | 81 | |
| 15 minutes | | 1530 | 140 | 80 | | 1740 | 145 | 80 | | 1480 | 130 | 81 | 1450 | 120 | 81 | |
| 20 minutes | | 1420 | 120 | 80 | | 1560 | 135 | 80 | | 1740 | 135 | 80 | 1480 | 120 | 81 | |
| 30 minutes | | 1540 | 130 | 80 | | 1640 | 135 | 80 | | 1520 | 125 | 80 | 1450 | 120 | 81 | |

In the foregoing Examples XXXVII to XXXX benzothiazyl disulfide is used as the accelerator in each compound, with zinc diethyldithiocarbamate as an activator in Example XXXVII, with diphenylguanidine as an activator in Example XXXVIII, with copper added to the compound of Example XXXVIII in Example XXXIX without much improvement, but with zinc diethyldithiocarbamate and copper together in the compound monocyclohexyl sulfenamide and copper with and without zinc diethyldithiocarbamate as an activator. Not much improvement is secured without the activator, although the improvement is marked with the activator. Comparison of Example XLIII and Example XLIV illustrates the value of copper added as the metal, in Example XLIII, and as the equivalent amount of copper diethyldithiocarbamate, this copper salt acting both as the source of copper and as the activator, in Example XLIV.

dithiocarbamate as an activator upon a compound in which cupric mercaptobenzothiazole

|  | Example XLV | Example XLVI | Example XLVII | Example XLVIII |
|---|---|---|---|---|
| GR-S rubber | 100 | 100 | 100 | 100 |
| Plasticizer | 5 | 5 | 5 | 5 |
| Zinc oxide | 5 | 5 | 5 | 5 |
| Channel carbon black | 50 | 50 | 50 | 50 |
| Sulfur | 2 | 2 | 2 | 2 |
| Benzothiazyldisulfide | 1.50 | | | |
| Zinc diethyldithiocarbamate | .15 | | | .15 |
| Cupric mercaptobenzothiazole | | | 1.50 | 1.50 |
| Mercaptobenzothiazole | | 1.50 | | |

BEFORE AGEING

| 307° F. | S | T | E | H | S | T | E | H | S | T | E | H | S | T | E | H |
|---|---|---|---|---|---|---|---|---|---|---|---|---|---|---|---|---|
| 5 minutes | Uncured | | | | Uncured | | | | Uncured | | | | 440 | 1130 | 630 | 52 |
| 10 minutes | 190 | 460 | 730 | 44 | 220 | 540 | 690 | 45 | 95 | 195 | 740 | 38 | 1465 | 2600 | 425 | 61 |
| 15 minutes | 460 | 1680 | 730 | 49 | 430 | 1150 | 635 | 48 | 220 | 520 | 700 | 42 | 2000 | 2510 | 355 | 65 |
| 20 minutes | 685 | 2500 | 660 | 56 | 540 | 1960 | 670 | 53 | 360 | 1030 | 635 | 50 | 2090 | 2490 | 340 | 67 |
| 30 minutes | 1075 | 2750 | 540 | 59 | 920 | 2600 | 580 | 57 | 775 | 2070 | 570 | 55 | 2390 | 2460 | 325 | 66 |

|  | Example XLIX | Example L |
|---|---|---|
| GR-S rubber | 100 | 100 |
| Plasticizer | 5 | 5 |
| Zinc oxide | 5 | 5 |
| Channel carbon black | 50 | 50 |
| Sulfur | 2 | 2 |
| Zinc diethyldithiocarbamate | | .15 |
| Cuprous mercaptobenzothiazole | 1.50 | 1.50 |

BEFORE AGEING

| 307° F. | S | T | E | H | S | T | E | H |
|---|---|---|---|---|---|---|---|---|
| 5 minutes | Uncured | | | | 510 | 1420 | 610 | 53 |
| 10 minutes | 145 | 360 | 740 | 42 | 1630 | 2750 | 430 | 64 |
| 15 minutes | 405 | 1270 | 690 | 48 | 2190 | 2470 | 320 | 67 |
| 20 minutes | 720 | 2320 | 640 | 56 | 2300 | 2410 | 310 | 68 |
| 30 minutes | 1380 | 2890 | 485 | 62 | | 2240 | 270 | 67 |

The foregoing Examples XLVII and XLVIII illustrate the remarkable effect of zinc diethyl- acts both as the source of copper and as the accelerator. The foregoing Examples XLIX and L similarly illustrate the effect of this activator upon a compound in which cuprous mercaptobenzothiazole acts both as the source of copper and as the accelerator. Examples XLV and XLVI are given to make the comparison complete.

The following Examples LI to LXIV illustrate the comparative effects of a variety of dithiocarbamates and thiuram sulfides as activators, each pair of examples showing the results secured with one such activator with and without added copper.

|  | Example LI | Example LII | Example LIII | Example LIV |
|---|---|---|---|---|
| GR-S rubber | 100 | 100 | 100 | 100 |
| Plasticizer | 5 | 5 | 5 | 5 |
| Zinc oxide | 5 | 5 | 5 | 5 |
| Channel carbon black | 50 | 50 | 50 | 50 |
| Sulfur | 2 | 2 | 2 | 2 |
| Benzothiazyldisulfide | 1.50 | 1.50 | 1.50 | 1.50 |
| Zinc dibutyldithiocarbamate | | | .15 | .15 |
| Zinc dimethyldithiocarbamate | .15 | .15 | | |
| Copper (through 300 Mesh) | | .10 | | .10 |

BEFORE AGEING

| 307° F. | S | T | E | S | T | E | S | T | E | S | T | E |
|---|---|---|---|---|---|---|---|---|---|---|---|---|
| 5 minutes | Uncured | | | 325 | 695 | 570 | Uncured | | | 260 | 575 | 610 |
| 10 minutes | 280 | 665 | 650 | 1440 | 2740 | 460 | 220 | 625 | 760 | 1250 | 2530 | 490 |
| 15 minutes | 510 | 1570 | 635 | 1795 | 2900 | 425 | 480 | 1650 | 675 | 1710 | 2790 | 400 |
| 20 minutes | 860 | 2170 | 545 | 2040 | 4780 | 375 | 860 | 2420 | 570 | 1885 | 2710 | 380 |

|  | Example LV | Example LVI | Example LVII | Example LVIII |
|---|---|---|---|---|
| GR-S rubber | 100 | 100 | 100 | 100 |
| Plasticizer | 5 | 5 | 5 | 5 |
| Zinc oxide | 5 | 5 | 5 | 5 |
| Channel carbon black | 50 | 50 | 50 | 50 |
| Sulfur | 2 | 2 | 2 | 2 |
| Benzothiazyldisulfide | 1.50 | 1.50 | 1.50 | 1.50 |
| Tetramethylthiuram disulfide | .15 | .15 | | |
| Tetramethylthiuram monosulfide | | | .15 | .15 |
| Copper (through 300 mesh) | | .10 | | .10 |

BEFORE AGEING

| 307° F. | S | T | E | S | T | E | S | T | E | S | T | E |
|---|---|---|---|---|---|---|---|---|---|---|---|---|
| 5 minutes | Uncured | | | 870 | 2380 | 580 | Uncured | | | 695 | 1980 | 600 |
| 10 minutes | 360 | 1060 | 665 | 1700 | 2720 | 395 | 350 | 900 | 630 | 1240 | 2740 | 445 |
| 15 minutes | 860 | 2210 | 590 | 2020 | 2480 | 355 | 730 | 2040 | 585 | 1890 | 2540 | 360 |
| 20 minutes | 1210 | 2480 | 490 | 2120 | 2560 | 320 | 1100 | 2650 | 535 | 2240 | 2560 | 320 |

|  | Example LIX | Example LX | Example LXI | Example LXII |
|---|---|---|---|---|
| GR-S rubber | 100 | 100 | 100 | 100 |
| Plasticizer | 5 | 5 | 5 | 5 |
| Zinc oxide | 5 | 5 | 5 | 5 |
| Channel carbon black | 50 | 50 | 50 | 50 |
| Sulfur | 2 | 2 | 2 | 2 |
| Benzothiazyldisulfide | 1.50 | 1.50 | 1.50 | 1.50 |
| Lead dimethyldithiocarbamate | .15 | .15 |  |  |
| Lead diethyldithiocarbamate |  |  | .15 | .15 |
| Copper (through 300 mesh) |  | .10 |  | .10 |

BEFORE AGEING

| 307° F. | S | T | E | S | T | E | S | T | E | S | T | E |
|---|---|---|---|---|---|---|---|---|---|---|---|---|
| 5 minutes | Uncured | | | Uncured | | | Uncured | | | 595 | 1440 | 545 |
| 10 minutes | 315 | 850 | 680 | 1165 | 2780 | 530 | 385 | 930 | 590 | 1460 | 2710 | 450 |
| 15 minutes | 515 | 1570 | 620 | 1520 | 2940 | 490 | 770 | 2670 | 580 | 1825 | 2940 | 425 |
| 20 minutes | 930 | 2420 | 545 | 1770 | 2360 | 390 | 1150 | 2680 | 525 | 1965 | 2320 | 335 |

|  | Example LXIII | Example LXIV |
|---|---|---|
| GR-S rubber | 100 | 100 |
| Plasticizer | 5 | 5 |
| Zinc oxide | 5 | 5 |
| Channel carbon black | 50 | 50 |
| Sulfur | 2 | 2 |
| Benzothiazyldisulfide | 1.50 | 1.50 |
| Selenium diethyldithiocarbamate | .15 | .15 |
| Copper (through 300 mesh) |  | .10 |

BEFORE AGEING

| 307° F. | S | T | E | S | T | E |
|---|---|---|---|---|---|---|
| 5 minutes | Uncured | | | 495 | 1470 | 600 |
| 10 minutes | 350 | 1020 | 665 | 1550 | 2590 | 410 |
| 15 minutes | 760 | 2060 | 565 | 2080 | 2375 | 325 |
| 20 minutes | 1230 | 2170 | 460 | 2425 | 2500 | 310 |

The plasticizer used in the foregoing examples was a mixture of 15 parts by weight of a petroleum sulfonate, 5 parts of normal butyl alcohol and 80 parts of a viscous petroleum oil (currently sold under the trade-name "Reogen").

The dithiocarbamates useful in carrying out my invention include zinc dimethyldithiocarbamate, zinc diethyldithiocarbamate, zinc dibutyldithiocarbamate, lead dimethyldithiocarbamate, lead diethyldithiocarbamate, selenium diethyldithiocarbamate, tellurium diethyldithiocarbamate, and sodium diethyldithiocarbamate. The thiuram sulfides useful in carrying out my invention include the tetraalkylthiuram monosulfides and disulfides. The thiazole accelerators useful in carrying out my invention include the mixed alkyl thiazyl disulfides, mercaptobenzothiazole, benzothiazyldisulfide, zinc benzothiazyl sulfide, dinitrophenylbenzothiazyl sulfide, aminated esters of mercaptobenzothiazole including phenylaminomethyl 2 benzothiazyl sulfide, benzoyl 2 benzothiazyl sulfide, benzyl hexamethylene tetrammonium 2 benzothiazyl sulfide and benzothiazyl 2 monocyclohexyl sulfenamide.

In carrying out my invention, the copper, or its equivalent compound, may be incorporated in the copolymer of butadiene and styrene before other compounding materials are added to produce a modified copolymer product exhibiting much less variability than currently available GR-S rubber when compounded and subjected to vulcanization in accordance with my invention. Also, in carrying out my invention, the copper, or its equivalent compound, may be incorporated in the copolymer compound with other compounding materials, as in conventional practice, prior to vulcanization. The proportion of sulfur used is not critical and may follow conventional practices providing it is added to the compound subjected to vulcanization in amount exceeding that required to combine with the added copper to form cupric sulfide.

I claim:

1. The product obtained upon vulcanization of a rubber-like copolymer of butadiene and styrene containing a material of the class consisting of metallic copper and compounds of copper effective to accelerate the sulfur vulcanization of the copolymer, in excess of 50% by weight on the copper (calculated as copper) of sulfur and about 0.1–1% by weight on the copolymer of a compound of the class consisting of thiuram sulfides and dithiocarbamates effective as sulfur vulcanization accelerators, the total amount of copper (calculated as copper) present in the copolymer being not less than about 0.005% nor more than about 1% by weight on the copolymer.

2. The product obtained upon vulcanization of a rubber-like copolymer of butadiene and styrene containing a material of the class consisting of metallic copper and compounds of copper effective to accelerate the sulfur vulcanization of the copolymer, in excess of 50% by weight on the copper (calculated as copper) of sulfur, about 0.5–2.5% by weight on the copolymer of a thiazole accelerator, and about 0.1–1% by weight on the copolymer of a compound of the class consisting of thiuram sulfides and dithiocarbamates effective as sulfur vulcanization accelerators, the total amount of copper (calculated as copper) present in the copolymer being not less than about 0.005% nor more than about 1% by weight on the copolymer.

3. The product obtained upon vulcanization of a rubber-like copolymer of butadiene and styrene containing a material of the class consisting of metallic copper and compounds of copper effective to accelerate the sulfur vulcanization of the copolymer, in excess of 50% by weight on the copper (calculated as copper) of sulfur and about 0.1–1% by weight on the copolymer of a zinc dialkyldithiocarbamate, the total amount of copper (calculated as copper) present in the copolymer being not less than about 0.005% nor more than about 1% by weight on the copolymer.

4. The product obtained upon vulcanization of a rubber-like copolymer of butadiene and styrene containing a material of the class consisting of metallic copper and compounds of copper effective to accelerate the sulfur vulcanization of the copolymer, in excess of 50% by weight on the copper (calculated as copper) of sulfur and about 0.1–1% by weight on the copolymer of a lead dialkyldithiocarbamate, the total amount of copper (calculated as copper) present in the copolymer being not less than about 0.005% nor more than about 1% by weight on the copolymer.

5. The product obtained upon vulcanization of a rubber-like copolymer of butadiene and styrene containing a material of the class consisting of metallic copper and compounds of copper effective to accelerate the sulfur vulcanization of the copolymer, in excess of 50% by weight on the copper (calculated as copper) of sulfur and about 0.1–1% by weight on the copolymer of thiuram sulfide effective as a sulfur vulcanization accelerator, the total amount of copper (calculated as copper) present in the copolymer being not less than about 0.005% nor more than about 1% by weight on the copolymer.

6. The product obtained upon vulcanization of a rubber-like copolymer of butadiene and styrene containing a material of the class consisting of metallic copper and compounds of copper effective to accelerate the sulfur vulcanization of the copolymer, in excess of 50% by weight on the copper (calculated as copper) of sulfur and about 0.1–1% by weight on the copolymer of a compound of the class consisting of thiuram sulfides and dithiocarbamates effective as sulfur vulcanization accelerators, the total amount of copper (calculated as copper) present in the copolymer being not less than about 0.01% nor more than about 0.5% by weight on the copolymer.

7. The product obtained upon vulcanization of a rubber-like copolymer of butadiene and styrene containing a material of the class consisting of metallic copper and compounds of copper effective to accelerate the sulfur vulcanization of the copolymer, in excess of 50% by weight on the copper (calculated as copper) of sulfur, about 0.5–2.5% by weight on the copolymer of a thiazole accelerator and about 0.1–1% by weight on the copolymer of a compound of the class consisting of thiuram sulfides and dithiocarbamates effective as sulfur vulcanization accelerators, the total amount of copper (calculated as copper) present in the copolymer being not less than about 0.01% nor more than about 0.5% by weight on the copolymer.

8. The product obtained upon vulcanization of a rubber-like copolymer of butadiene and styrene containing a material of the class consisting of metallic copper and compounds of copper effective to accelerate the sulfur vulcanization of the copolymer, in excess of 50% by weight on the copper (calculated as copper) of sulfur and about 0.1–1% by weight on the copolymer of a zinc dialkyldithiocarbamate, the total amount of copper (calculated as copper) present in the copolymer being not less than about 0.01% nor more than about 0.5% by weight on the copolymer.

9. The product obtained upon vulcanization of a rubber-like copolymer of butadiene and styrene containing a material of the class consisting of metallic copper and compounds of copper effective to accelerate the sulfur vulcanization of the copolymer, in excess of 50% by weight on the copper (calculated as copper) of sulfur and about 0.1–1% by weight on the copolymer of a lead dialkyldithiocarbamate, the total amount of copper (calculated as copper) present in the copolymer being not less than about 0.01% nor more than about 0.5% by weight on the copolymer.

10. The product obtained upon vulcanization of a rubber-like copolymer of butadiene and styrene containing a material of the class consisting of metallic copper and compounds of copper effective to accelerate the sulfur vulcanization of the copolymer, in excess of 50% by weight on the copper (calculated as copper) of sulfur and about 0.1–1% by weight on the copolymer of a thiuram sulfide effective as a sulfur vulcanization accelerator, the total amount of copper (calculated as copper) present in the copolymer being not less than about 0.01% nor more than about 0.5% by weight on the copolymer.

ALBERT A. SOMERVILLE.